C. GRAVES, G. C. POWERS & C. O. GRAVES.
Milk-Coolers.
No. 152,743.
Patented July 7, 1874.
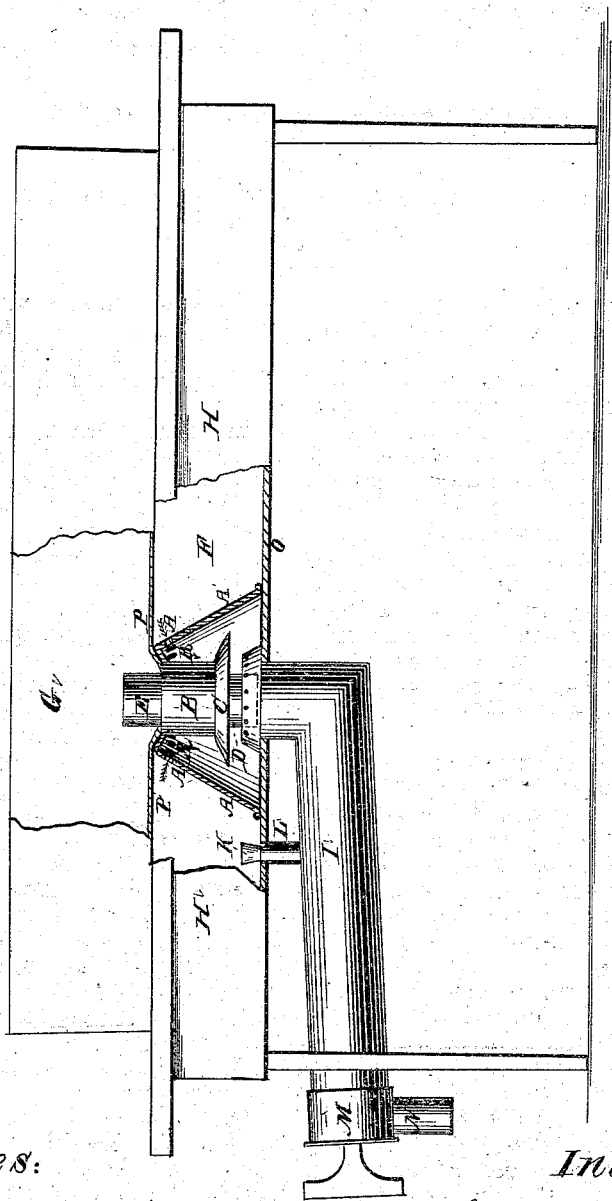
Witnesses:
Geo. W. Kennedy
Fred C Graves
Inventors:
Cecil Graves
George C Powers
C O Graves

UNITED STATES PATENT OFFICE.

CECIL GRAVES, GEORGE C. POWERS, AND CHARLES O. GRAVES, OF WATERBURY, VERMONT.

IMPROVEMENT IN MILK-COOLERS.

Specification forming part of Letters Patent No. 152,743, dated July 7, 1874; application filed January 3, 1874.

*To all whom it may concern:*

Be it known that we, CECIL GRAVES, GEORGE POWERS, and CHAS. O. GRAVES, of Waterbury, in the county of Washington and State of Vermont, have invented a new and Improved Mode of Cooling Milk, the following being a correct description, reference being had to the accompanying drawings and letters of reference marked thereon.

The nature of our invention consists in providing a convenient method of drawing the milk and water out of milk-coolers, both through the same tube, without having them intermingle in the least, and without fastening the pan to the cooler or having to use packing of any kind, leaving the pan easy to be removed and not liable to get out of repair, and be of small expense.

Figure 1, A A A A represent the inverted cup, with bottom depressed to fit the depression in the bottom of the pan; B B, short tube soldered to the bottom of the cup; C, circular plate fastened to tube B B; D, the tube attached to the depression in the pan G. E represents a cork fitted to tube D. F F represent the water-space between the two pans. G represents the milk-pan; H H, milk-cooler, cut away to show the tubes; I, large tube; K, cork for tube L; L, small water-tube; M, stop-cock; N, tube to carry off milk or water; O, bottom of cooler; P, bottom of pan; R R, holes in bottom of inverted cup A A A A.

The first difficulty to be overcome is to prevent the water from mixing with the milk when it (the milk) passes into the tube I, by leaking between the cooler and pan and the tubes B B and D. This leakage is prevented by first opening the stop-cock M, and allowing the surface water to pass off through the holes R R until the surface of the water in the cooler is on the same level as the said holes R R and below the place of leakage aforesaid. This prevents the water from running into the tube I while the milk is passing off. After the water is thus drawn down to a level with the holes R R, then the milk is let out by removing the cork E.

The next difficulty is that the milk, when let into the tube I, will whirl around in a whirlpool, and set back, through the holes R R, into the cooler, and so mix with the water. This is overcome by the plate C, which stops the milk as it whirls, and sets back and prevents it, so that not a drop of milk passes through the holes R R. Without the plate C the milk would run, through the holes R R, into the cooler, and, mixing with the water there, would waste, and make it much more difficult to keep the pan pure and sweet.

The inverted cup is an ordinary tin cup, about three inches in diameter and one inch deep, soldered to the cooler H H. The tubes I, B B, and D are made of tin, about one and one-fourth inch in diameter. The plate C is made of tin, nearly as large as the inner diameter of the inverted cup, allowing a small space for the water that comes through the holes R R to pass into the tube I. The tube L is about one-half inch in diameter, and is used to draw off all the water from the cooler after the milk has passed off and the pan G been removed.

What we claim as our invention, and desire to secure by Letters Patent, is—

The pans G and H and inverted cup A, having holes R, end tube B, provided with plate C, in combination with tubes D, I, and L, as and for the purpose set forth.

CECIL GRAVES.
GEORGE C. POWERS.
C. O. GRAVES.

Attest:
GEO. W. KENNEDY,
FRED. C. GRAVES.